United States Patent
Loncle et al.

(10) Patent No.: US 11,866,178 B2
(45) Date of Patent: Jan. 9, 2024

(54) AIR INTAKE OF AN AIRCRAFT TURBINE ENGINE NACELLE

(71) Applicant: SAFRAN NACELLES, Gonfreville-l'Orcher (FR)

(72) Inventors: Alexis Yves-Marie Loncle, Moissy-Cramayel (FR); Laurent Georges Valleroy, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 177 days.

(21) Appl. No.: 17/630,869

(22) PCT Filed: Aug. 11, 2020

(86) PCT No.: PCT/EP2020/072483
§ 371 (c)(1),
(2) Date: Jan. 27, 2022

(87) PCT Pub. No.: WO2021/032534
PCT Pub. Date: Feb. 25, 2021

(65) Prior Publication Data
US 2022/0267019 A1    Aug. 25, 2022

(30) Foreign Application Priority Data

Aug. 18, 2019   (FR) ..................................... 1909254

(51) Int. Cl.
*B64D 15/04*   (2006.01)
*B64D 33/02*   (2006.01)

(52) U.S. Cl.
CPC .............. *B64D 15/04* (2013.01); *B64D 33/02* (2013.01); *B64D 2033/0233* (2013.01); *B64D 2033/0286* (2013.01)

(58) Field of Classification Search
CPC ........................ B64D 15/04; B64D 2033/0233
See application file for complete search history.

(56) References Cited

U.S. PATENT DOCUMENTS

| | | | |
|---|---|---|---|
| 2007/0130912 A1* | 6/2007 | Kraft ....................... | F28F 27/02 60/785 |
| 2009/0108134 A1* | 4/2009 | Thodiyil ................ | B64D 15/04 244/134 B |

(Continued)

FOREIGN PATENT DOCUMENTS

| | | |
|---|---|---|
| EP | 0918149 A1 | 5/1999 |
| EP | 0922842 A1 | 6/1999 |
| JP | H01237294 A | 9/1989 |

OTHER PUBLICATIONS

Search Report from the French Intellectual Property Office on corresponding FR application (FR1909254) dated Feb. 11, 2020.

(Continued)

*Primary Examiner* — Jessica B Wong
(74) *Attorney, Agent, or Firm* — KOS IP Law LLP

(57) ABSTRACT

Disclosed is an air intake of an aircraft turbine engine nacelle having a lip, a downstream portion and an internal partition separating the lip and the downstream portion, the lip delimiting an annular recess, the downstream portion having a downstream inner wall and a downstream outer wall, the air intake having an injection channel for injecting a hot air stream into the annular recess, a passage opening formed in the internal partition, an outlet opening formed in the downstream outer wall and a discharge channel for discharging the hot air stream mounted in the downstream portion and having a first end connected to the internal partition, a second end connected to the downstream outer wall and a main body having at least one flexible portion.

7 Claims, 3 Drawing Sheets

(56) References Cited

U.S. PATENT DOCUMENTS

| | | | |
|---|---|---|---|
| 2009/0194633 A1* | 8/2009 | De Souza | B64D 15/04 244/54 |
| 2010/0252685 A1* | 10/2010 | Porte | B64D 15/04 244/134 B |
| 2014/0263837 A1 | 9/2014 | Sternberger | |
| 2017/0122204 A1* | 5/2017 | Versaevel | F02C 7/045 |
| 2017/0191585 A1 | 7/2017 | Maben | |
| 2019/0263529 A1* | 8/2019 | Edwards | B64C 21/06 |
| 2020/0025072 A1* | 1/2020 | Mackin | B64D 33/04 |
| 2020/0108942 A1* | 4/2020 | Laly | B64D 33/02 |
| 2020/0141317 A1* | 5/2020 | Kroeger | B64D 33/02 |
| 2021/0024220 A1* | 1/2021 | Burton | B64D 15/04 |
| 2021/0324799 A1* | 10/2021 | Suzuki | F01D 15/10 |
| 2022/0186665 A1* | 6/2022 | Corbin | F02C 7/14 |

OTHER PUBLICATIONS

International Search Report and Written Opinion on corresponding PCT application (PCT/EP2020/072483) from International Searching Authority (EPO) dated Oct. 22, 2020.

* cited by examiner

AIR INTAKE OF AN AIRCRAFT TURBINE ENGINE NACELLE

TECHNICAL FIELD

The present invention relates to the field of aircraft turbomachines, and is more particularly concerned with an air intake of an aircraft turbomachine nacelle.

In a known manner, with reference to FIG. 1, an aircraft comprises one or more turbomachines 100 extending longitudinally along an axis X and allowing the aircraft to be moved from an incoming air flow F into the turbomachine 1 and circulating from upstream to downstream. Hereafter, the terms "upstream" and "downstream" are defined with respect to the axis X oriented from upstream to downstream. Similarly, the terms "internal" and "external" are defined along the radial direction with respect to the axis X.

As illustrated in FIG. 1, the turbomachine 100 comprises from upstream to downstream a compressor 101, a combustion chamber 102, and a turbine 103 for rotatably driving the compressor 101. The turbomachine 100 further comprises a fan 104 upstream of the compressor 101, rotatably mounted about the axis X in order to accelerate the incoming air flow F along the axis X, and a nacelle 105 extending radially outwardly from the fan 104.

In a known manner, the nacelle 105 comprises an air intake 106 extending upstream of the fan 104, thereby separating the incoming air flow F into an internal air flow Fint that is guided towards the fan 104 and an external air flow Fext that is guided externally to the nacelle 105. The air intake 106 comprises an upstream part 107, known to the person skilled in the art as a "lip", and a downstream part 108. In the example of FIG. 1, the lip 107 is separated from the downstream part 108 by an internal partition wall 109.

Still with reference to FIG. 1, the lip 107 comprises an internal wall 110 facing the axis X and an external wall 111 opposite to the internal wall 110, which are connected by an upstream wall 112 so as to form, with the internal partition wall 109, an annular cavity 113, known to the person skilled in the art as "D-Duct". The downstream part 108 in turn comprises a downstream internal wall 114 and a downstream external wall 115 as an extension of the internal wall 110 and the external wall 111 of the lip 107 respectively, which together delimit an internal volume 116 in which one or more acoustic attenuation panels are generally mounted.

In a known manner, during the flight of an aircraft, ice is likely to accumulate at the lip 107 due to temperature and pressure conditions, until it forms blocks of ice that are caused to be detached from the lip 107 and to be ingested by the turbomachine 100. Such ingestions have to be avoided in order to improve the life time of the turbomachine 100 and to reduce malfunctions.

To avoid ice accumulation, a pneumatic de-icing device is known in prior art comprising a conduit for injecting a flow of pressurized hot air into the annular cavity 113 of the lip 107 for heating the walls 110, 111, 112. The flow of pressurized hot air is generally taken from the compressor 101 of the turbomachine 100. Such a de-icing device is described in particular in patent application WO2010012899.

To ensure discharge of the injected hot air flow from the annular cavity 113, it is known from patent applications EP0922842A1 and US2014263837 to provide a discharge conduit connected to the annular cavity 113 and opening into the external wall 115 of the downstream part 108 of the air intake 106 so that the hot air is expelled outwardly of the nacelle 105. With reference to FIG. 1, the discharge conduit 200 extends into the internal volume 116 of the downstream part 108 of the air intake 106. In practice, the discharge conduit 200 is in the form of a bent tube of titanium, one end of which opens into a first hole in the internal partition wall 109 and a second end of which opens into the external wall 115 of the downstream part 108 of the air intake 106.

Such a discharge conduit 200 has the drawback of having a substantial mass in order to withstand significant mechanical forces during the flight of the aircraft, in particular, due to thermal expansion.

In practice, in order to allow a robust and rigid connection, it is known to equip the ends of the discharge conduit 200 with titanium plates which are respectively attached at the internal partition wall 109 and the downstream external wall 115. Seals are also traditionally added to the attachment interface to ensure sealing. The addition of plates and seals is further detrimental to the mass of such a discharge conduit 200.

Incidentally, a method for manufacturing a fiber-reinforced thermoplastic conduit by means of a silicone mandrel is known from patent application US2017/191585A1.

The invention thus aims at enabling simple and efficient discharge of the hot air flow injected by the de-icing device into the annular cavity, by means of a system that can withstand mechanical forces and has a reduced mass.

SUMMARY

The invention relates to an air intake of an aircraft turbomachine nacelle extending longitudinally along an axis X in which an air flow circulates from upstream to downstream, said air intake comprising a lip extending upstream, a downstream part and an internal partition wall separating the lip and the downstream part, said lip comprising an internal wall facing the axis X an external wall opposite to the internal wall and an upstream wall connecting the internal wall and the external wall and delimiting with the internal partition wall an annular cavity, said downstream part comprising a downstream internal wall and a downstream external wall as an extension of the internal wall and the external wall of said lip respectively, and delimiting between them an internal volume, said air intake comprising:

i. a de-icing device comprising at least one conduit for injecting a flow of hot air into the annular cavity of the lip,
 ii. at least one passage opening formed in the internal wall
 iii. at least one outlet opening formed in the downstream external wall of the downstream wall, and
 iv. at least one discharge conduit, mounted in the internal volume of the downstream part, configured to conduct the flow of hot air from the passage opening of the internal partition wall to the outlet opening of the downstream external wall so as to discharge the flow of hot air outwardly of the air intake, the discharge conduit comprising a first end connected to the internal partition wall, a second end connected to the downstream external wall of the downstream portion and a main body extending between the first end and the second end.

The invention is remarkable in that the main body of the discharge conduit comprises at least one flexible portion. By virtue of the invention, the discharge conduit is able to withstand mechanical forces involved in the air intake as well as stresses generated by thermal expansion of the materials. The flexible portion of the main body can in fact be slightly deformed to respond to said forces and stresses involved in the air intake. The flexible portion advantageously allows vibrations between the ends of the discharge conduit to be attenuated. In addition, such a discharge conduit has a reduced mass in comparison with a titanium tube according to prior art. The mass is further reduced by the fact that such a discharge conduit does not require additional reinforcements at the first end and second end, unlike prior art. The assembly is further simplified due to the flexible portion which offers greater assembly tolerances.

Preferentially, the air intake comprises a single discharge conduit, sufficient to discharge the hot air flow present in the annular cavity.

According to one aspect of the invention, the flexible portion of the main body comprises at least one elastomer, preferably silicone. Such a material is able to deform and withstand high temperatures of the hot air flow, up to 300° C.

Preferably, the elastomer is reinforced with fibers, preferably glass or carbon fibers, to increase mechanical strength of the discharge conduit without impacting its mass.

According to a first aspect of the invention, the main body comprises a downstream portion and an upstream portion, the downstream portion being the flexible portion. Preferably, the main body comprises only a downstream portion and an upstream portion. Advantageously, the downstream portion, connected to the downstream external wall, is the portion where most of the mechanical forces are exerted. The flexible nature of the downstream portion thus makes it possible to respond to most of the forces exerted on the discharge conduit.

Preferably, the upstream portion of the main body is rigid in order to provide the discharge conduit with greater mechanical strength. Preferably, the upstream portion has a smaller cross-sectional area than the downstream portion. A reinforced upstream portion allows for reduced deformation for a small cross-sectional area.

According to a preferred aspect, the downstream portion and the upstream portion are sealingly connected, preferably by screwing, so as to ensure proper discharge of the hot air flow outwardly of the air intake.

According to a second aspect of the invention, the main body comprises only a flexible portion, which reduces the mass and gives the discharge conduit a greater distortion capacity.

According to another aspect of the invention, the first end of the discharge conduit is in the form of a first, preferably metallic, plate preferably comprising a titanium alloy. Preferably, the second end of the discharge conduit is in the form of a second, preferably metallic, plate preferably comprising a titanium alloy. Such ends allow for both sealed and rigid attachment to the internal partition wall and the downstream external wall of the downstream part.

Preferably, the flexible portion comprises a ribbed external wall.

The invention also relates to an aircraft turbomachine extending longitudinally along an axis X in which an air flow circulates from upstream to downstream, said turbomachine comprising a nacelle comprising an air intake as previously described.

The invention further relates to a method for discharging the hot air flow injected by the de-icing device into the annular cavity of the lip of the air intake, as previously described, wherein the discharge conduit conveys the hot air flow from the passage opening of the internal partition wall to the outlet opening of the downstream external wall, so as to discharge the hot air flow outwardly of the air intake.

BRIEF DESCRIPTION OF THE DRAWINGS

The invention will be better understood from the following description, which is given by way of example only, and refers to the appended drawings, which are given as non-limiting examples, in which identical references are given to similar objects and in which.

It should be noted that the figures set out the invention in detail for implementing the invention, said figures of course being capable of serving to better define the invention where appropriate.

DETAILED DESCRIPTION

The invention, set forth hereinafter with reference to FIGS. 2 to 5, makes it possible to discharge in a simple and effective manner the hot air flow from air intake of an aircraft turbomachine used to prevent ice accumulation.

Figure 1:
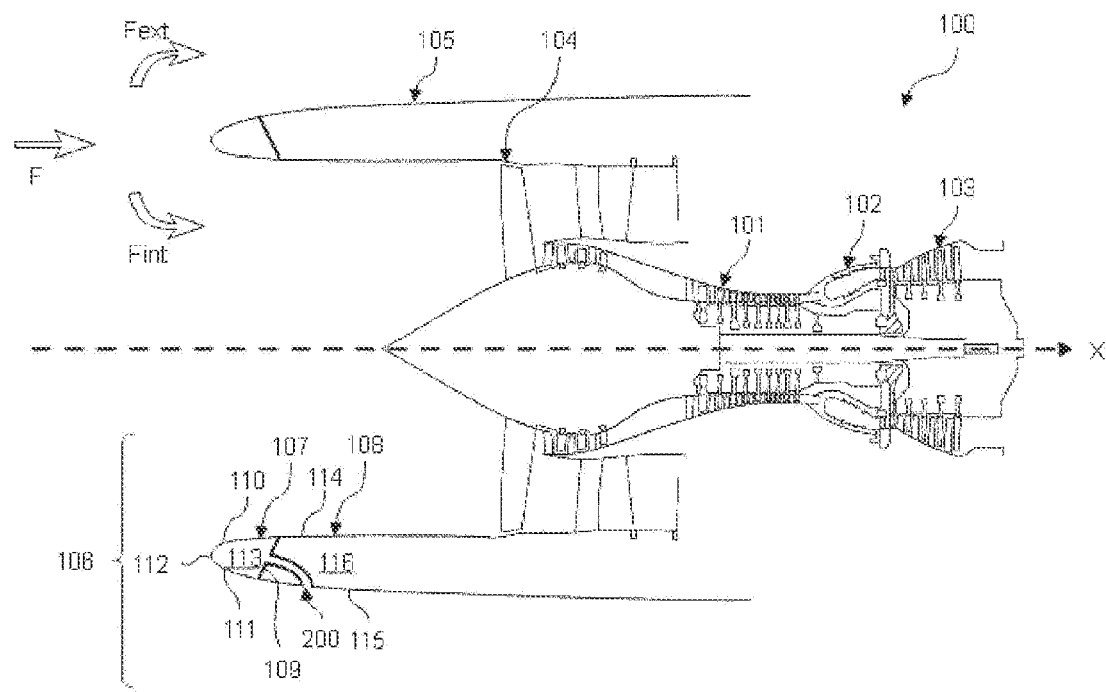
FIG. 1 is a schematic representation in a longitudinal cross-section view of a turbomachine comprising an air intake according to prior art.
Figure 2:
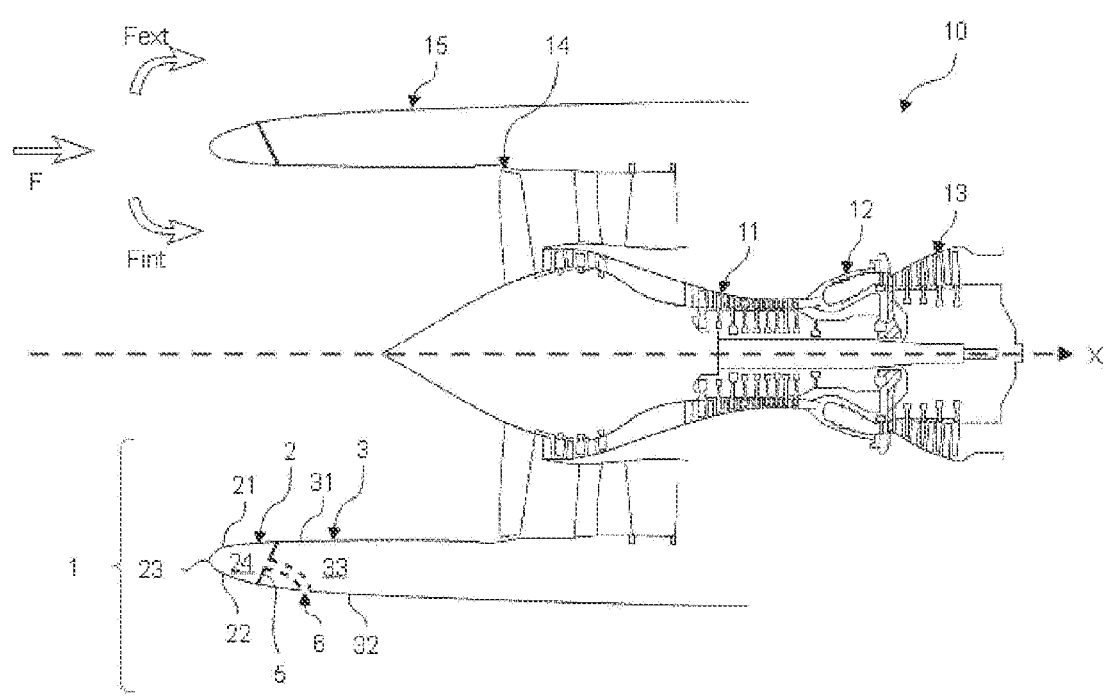
FIG. 2 is a schematic representation in a longitudinal cross-section view of a turbomachine comprising an air intake according to the invention.

As previously described, with reference to FIG. 2, an aircraft turbomachine 10 extends longitudinally along an axis X and allows an aircraft to be moved from an incoming air flow F circulating upstream to downstream in said turbomachine 10. Hereinafter, the terms "upstream" and "downstream" are defined with respect to the axis X oriented from upstream to downstream. Similarly, the terms "internal" and "external" are defined along the radial direction with respect to the axis X.

As illustrated in FIG. 2, the turbomachine 10 comprises from upstream to downstream a compressor 11, a combustion chamber 12, and a turbine 13 for rotatably driving the compressor 11. The turbomachine 10 further comprises a fan 14 upstream of the compressor 11, rotatably mounted about the axis X to accelerate the incoming air flow F along the axis X, and a nacelle 15 extending radially outwardly from the fan 14. The nacelle 15 comprises an air intake 1 extending upstream of the fan 14, thereby separating the incoming air flow F into an internal air flow Fint which is guided towards the fan 14 and an external air flow Fext which is guided externally to the nacelle 15. The air intake 1 of the nacelle 15 is more precisely described below.

Still with reference to FIG. 2, the air intake 1 comprises an upstream part 2, known to those skilled in the art as "lip", and a downstream part 3, which are separated by an internal partition wall 5. The air intake 1 also comprises a de-icing device with an injection conduit 4 for a hot air flow Fac (FIGS. 3 and 4) which is mounted in the lip 2 in order to heat the lip 2 so as to avoid ice accumulation. The air intake 1 further comprises a discharge conduit 6 mounted in the downstream part 3 for discharging the hot air flow Fac injected by the injection conduit 4 outwardly of the air intake 1.

Figure 3:
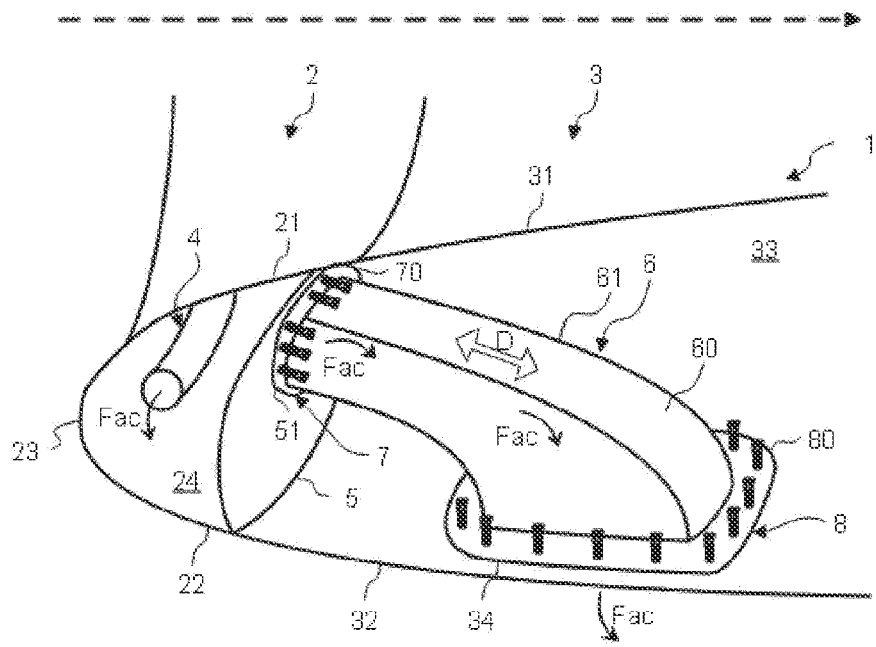
FIG. 3 is a schematic perspective representation of an air intake according to a first embodiment of the invention.
Figure 4:
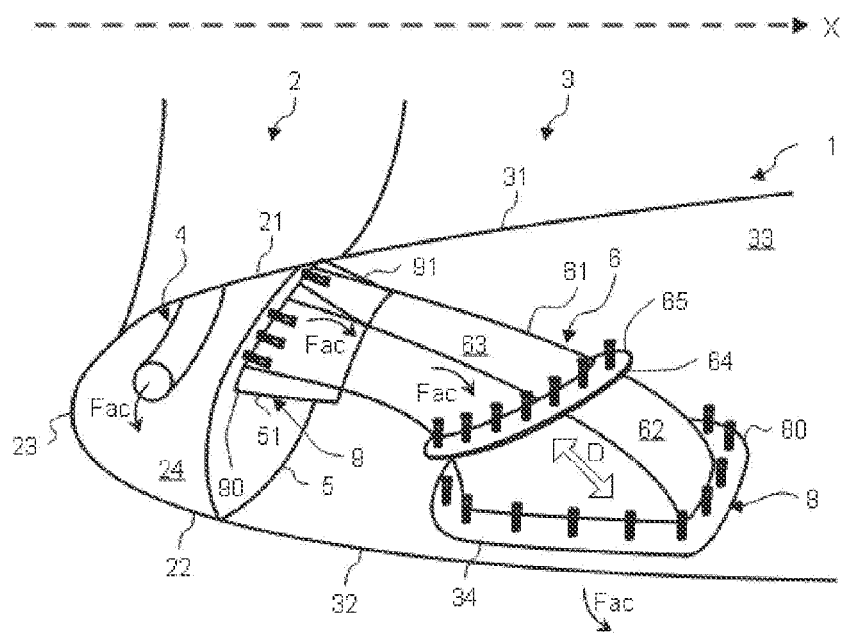
FIG. 4 is a schematic perspective representation of an air intake according to a second embodiment of the invention and FIG. 5 is a schematic perspective representation of an air intake according to an alternative embodiment of the invention.

As illustrated in FIGS. 2, 3 and 4, the lip 2 has an internal wall 21 facing the axis X and an external wall 22 opposite to the internal wall 21, which are connected through an upstream wall 23 so as to form an annular cavity 24 with the internal wall 5, also known to the skilled person as "D-Duct".

The injection conduit 4 for a hot air flow Fac of the de-icing device is mounted in the annular cavity 24. In the example of FIGS. 3 and 4, the injection conduit 4 forms a revolution about the axis X in the annular cavity 24 and comprises a plurality of perforations, so as to inject the hot air flow Fac into the entire annular cavity 24, so as to uniformly heat the walls 21, 22, 23 of the lip 2. Such an injection conduit 4 is known to the skilled person.

As illustrated in FIGS. 2, 3 and 4, the downstream part 3 of the air intake 1 in turn comprises a downstream internal wall 31 and a downstream external wall 32 as an extension of the internal wall 21 and the external wall 22 of the lip 2, respectively. The downstream part 3 also comprises an internal volume 33 delimited by the downstream internal wall 31, by the downstream external wall 32 and by the internal partition wall 5.

With reference to FIGS. 3 and 4, the internal partition wall 5 additionally comprises a passage opening 51 allowing the annular cavity 24 of the lip 2 and the internal volume 33 of the downstream part 3 to be placed in fluid communication. Preferably, the internal partition wall 5 comprises a plurality of passage openings 51 in the form of slots, further preferably arranged parallel next to each other. However, it goes without saying that the internal partition wall 5 may comprise a single passage opening 51, of any size and shape. The internal wall 5 may also comprise several passage openings 51 distributed at different angular positions about the axis X.

Still with reference to FIGS. 3 and 4, the downstream external wall 32 comprises, in a similar manner to the internal partition wall 5, an outlet opening 34 for fluidly communicating the internal volume 33 of the downstream part 3 with the outside of the air intake 1. Preferably, the downstream external wall 32 comprises a plurality of outlet openings 34 in the form of slots arranged in parallel next to one another. However, it goes without saying that the downstream external wall 32 may comprise a single outlet opening 34, of any size and shape. The downstream external wall 32 may also comprise a plurality of outlet openings 34 distributed at different angular positions about the axis X.

As illustrated in FIGS. 3 and 4, the discharge conduit 6 is mounted within the internal volume 33 of the downstream part 3 and is configured to fluidly communicate the passage opening 51 of the internal partition wall 5 and the outlet opening 34 of the downstream external wall 32, so as to discharge the hot air stream Fac contained in the annular cavity 24 outwardly of the air intake 1.

In this example, the air intake 1 has a single passage opening 51 and a single outlet opening 34, with the discharge conduit 6 configured to fluidly communicate the single passage opening 51 of the internal wall 5 and the single outlet opening 34. Of course, a discharge conduit 6 may fluidly communicate one or more passage openings 51 of the internal wall 5 and one or more outlet openings 34 of the downstream external wall 32 depending on the configurations. Preferably, the air intake 1 comprises a single discharge conduit 6, sufficient to discharge the hot air flow Fac. However, it goes without saying that the air intake 1 could comprise several discharge conduits 6 at different angular positions about the axis X, each providing fluid communication between one or more passage openings 51 and one or more outlet openings 34.

With reference to FIGS. 3 and 4, a discharge conduit 6 comprises a first end 7, 9 connected to the internal wall 5, a second end 8 connected to the downstream external wall 32, and a main body 61 extending between the first end 7, 9 and the second end 8. In the example of FIGS. 3 and 4, the first end 7, 9 extends substantially perpendicular to the second end so that the main body 61 has a bent shape to be able to connect the first end 7, 9 and the second end 8. Preferably, the main body 61 has a rounded bent shape so as to ensure circulation with low pressure losses of the hot air flow Fac. Furthermore, in the example of FIGS. 3 and 4, the cross-section of the discharge conduit 6 is rectangular, but it goes without saying that the cross-section could be different, such as circular as an example.

In this example, the main body 61 has a substantially increasing cross-section from upstream to downstream in order to facilitate discharge.

According to the invention, the main body 61 of the discharge conduit 6 has at least one flexible portion 60, 62 as illustrated in FIGS. 3 and 4. As will be set forth subsequently, according to a first embodiment of the invention illustrated in FIG. 3, the main body 61 is fully flexible or, to a second embodiment of the invention illustrated in FIG. 4, partially flexible. The term "flexible" is used here to refer to the ability of the main body 61 to bend slightly without breaking, i.e., to undergo mechanical deformation D, as opposed to the term "rigid". A flexible portion is opposed to a rigid metal portion as known in prior art.

Preferably, the flexible portion 60, 62 of the main body 61 comprises an elastomer, for example silicone, having good flexibility and resisting high temperatures observed in the air intake 1. Preferably, the elastomer is reinforced by fibers, to increase the mechanical strength of the discharge conduit 6, the fibers being preferably glass fibers or carbon fibers.

Figure 5:
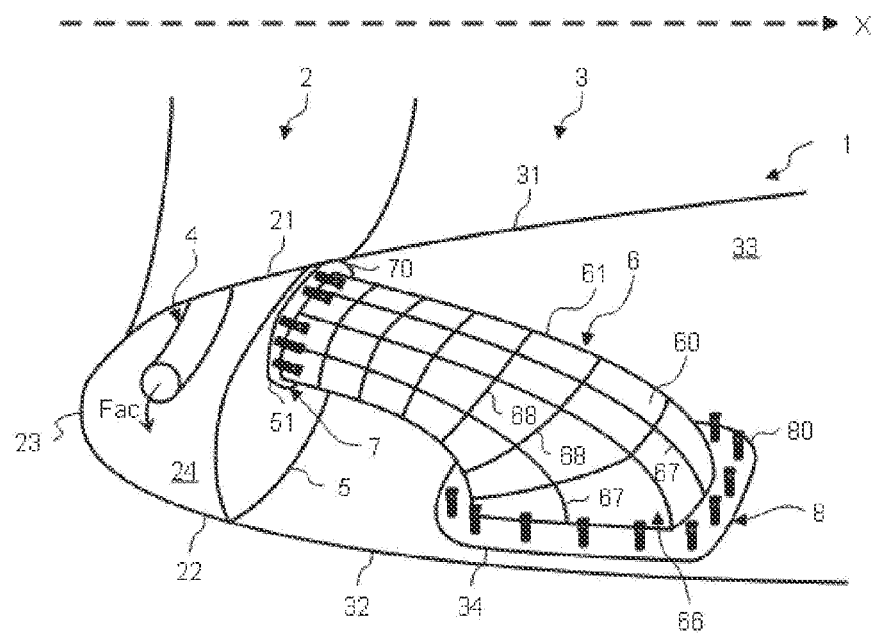

Also preferably, as illustrated in FIG. 5, the flexible portion 60 has a ribbed external wall 66 in order to increase its mechanical strength. In this example, the ribbed external wall 66 comprises longitudinal ribs 67 extending along the length of the flexible portion 60, in other words, along the curvilinear axis of the flexible portion 60, and transverse ribs 68. The transverse ribs 68 follow the shape of the cross-section of the flexible portion 60 in this rectangular example, and advantageously make it possible to preserve shape of said cross-section of the flexible portion 60. The longitudinal ribs 67, for their part, advantageously provide better mechanical buckling strength. It goes without saying that the ribbed external wall 66 could comprise only longitudinal ribs 67 or transverse ribs 68, or even comprise ribs with any orientation.

Advantageously, such a discharge conduit 6 is capable of absorbing mechanical forces involved in the air intake 1 and of compensating for thermal expansion of the materials of the air intake 1, by undergoing a mechanical deformation D. Such a discharge conduit 6 thus has a more durable mechanical strength in comparison with the titanium bent tube of prior art. In particular, mechanical stresses exerted at the ends 7, 8, 9 are significantly reduced. Furthermore, the discharge conduit 6 has a very low mass in comparison with the titanium bent tube of prior art, which is an important advantage for an aeronautical application. Such a discharge conduit 6 has a better resistance to mechanical vibrations and is easier to assemble.

A fully flexible main body 61 according to a first embodiment of the invention (FIG. 3) and a partially flexible main body 61 according to the second embodiment of the invention (FIG. 4) are described in the following.

According to the first embodiment of the invention, with reference to FIG. 3, the discharge conduit 6 comprises a fully flexible main body 61, which gives a large deformation capacity D to the discharge conduit 6. In other words, the main body 61 consists of the flexible portion 60.

In the example of FIG. 3, the first end 7 and the second end 8 are in the form of plates 70, 80, referred to as "first plate 70" and "second plate 80", respectively, configured to be attached against the internal partition wall 5 and the downstream external wall 32, respectively. In this example, the first plate 70 and the second plate 80 comprise perforations at their periphery configured to receive fastening rods such as screws or nails, in order to be attached. It goes without saying that the first plate 70 and/or the second plate 80 could be attached in other ways, such as by bonding, for example, but screw attachment has the advantage of being robust and durable. It goes without saying that the ends could also be in a form other than plates, however such plates have the advantage of having a reduced overall size.

Preferably, the first plate 70 and/or the second plate 80 are flattened in such a way as to cooperate in a form-fitting manner with the internal partition wall 5 and/or the downstream external wall 32, which improves sealing.

Preferably, the first plate 70 and/or the second plate 80 are metallic so as to have sufficient mechanical strength. In this example, the plates 70, 80 comprise a titanium alloy. Advantageously, such plates 70, 80 are sufficient to ensure strength of the discharge conduit 6. The addition of reinforcements and/or seals is not necessary unlike prior art, which further reduces the mass of the discharge conduit 6. Thus, the discharge conduit 6 comprises a main body 61 connected to a first rigid plate 70 and a second rigid plate 80, which are preferably metallic. This provides a compromise between flexibility and rigidity, with the flexible portion 60 attenuating vibrations between the ends of the discharge conduit 6.

According to the second embodiment of the invention, with reference to FIG. 4, the main body 61 of the discharge conduit comprises a downstream portion 62 which is flexible and an upstream portion 63 which is rigid. In this example, the upstream portion 63 is metallic and preferably comprises a titanium alloy.

Advantageously, the downstream portion 62 compensates for the mechanical forces present in the air intake 1 while the upstream portion 63 has greater mechanical strength. Increased mechanical strength upstream is advantageous given that the cross-section of the discharge conduit 6 is smaller upstream. In addition, the overall size is more restrained upstream and increased mechanical strength reduces any undesirable clearance of the discharge conduit. In addition, the downstream portion of the discharge conduit 6 corresponds to the zone most prone to mechanical failure under mechanical stresses. The use of a flexible downstream portion 62 enables risk of rupture to be reduced.

The second embodiment thus advantageously combines the advantages of a rigid tube and a flexible discharge conduit 6.

As in the first embodiment, the first end 9 and the second end 8 of the discharge conduit 6 are in the form of plates 90, 80, referred to as "first plate 90" and "second plate 80" respectively. However, as illustrated in FIG. 4, the first end 9 preferably also comprises reinforcements to compensate for the rigidity of the upstream portion 63. In the example of FIG. 4, the reinforcements are in the form of buttresses 91 bearing against the internal partition wall 5. A seal could also be added to the first end 9.

Still with reference to FIG. 4, the downstream portion 62 and the upstream portion 63 are sealingly connected. In this example, the upstream portion 63 comprises a first connecting end, opposite to the first end 9, which is in the form of a plate 65, referred to as "third plate 65". Similarly, the downstream portion 62 comprises a second connecting end, opposite to the second end 8, which is in the form of a plate 64, referred to as "fourth plate 64". As before, the third plate 65 and the fourth plate 64 are perforated and configured to cooperate by screwing. However, it goes without saying that the downstream portion 62 and the upstream portion 63 could be connected in other ways.

According to a third embodiment not represented, the upstream portion 63 and the downstream portion 62 could be flexible and connected together in a modular fashion. According to a fourth embodiment of the invention not represented, the upstream portion 63 is flexible while the downstream portion 62 is rigid. Reinforcements and/or a seal are then preferably added to the second end 8 but would no longer be required on the first end 9. According to a fifth embodiment of the invention not represented, the main body 61 could comprise more than two different portions. In particular, the main body 61 could comprise alternating rigid and flexible portions.

A method for discharging the hot air flow Fac injected through the injection conduit 4 into the annular cavity 24, by means of the previously described discharge conduit 6, is described below. With reference to FIGS. 3 and 4, the pressurized hot air flow Fac circulates into the annular cavity 24 to de-ice the walls 21-23 of the lip 1. Then, the pressurized hot air flow Fac contained in the annular cavity 24 is sucked in through the passage opening 51 and then is conveyed through the discharge conduit 6 to the outlet opening 34, where the hot air flow Fac is released outwardly of the air intake 1.

By virtue of the invention described above, the hot air flow Fac injected into the annular cavity 24 of the lip 2 can be discharged in a simple and convenient manner by means of a discharge conduit 6 with reduced mass. The flexible nature of the discharge conduit 6 also allows mechanical forces in the air intake 1 to be absorbed, as well as compensating for thermal expansion of the materials due to the temperature conditions in the air intake 1 during flight, making the discharge conduit 6 more efficient and durable. Assembly is further simplified due to the flexible portion 60, 62 which provides greater assembly tolerances.

The invention claimed is:
1. An air intake of a nacelle of an aircraft turbomachine extending longitudinally along an axis X in which an air flow circulates from upstream to downstream, said air intake comprising a lip extending upstream, a downstream part and an internal partition wall separating the lip and the downstream part, said lip comprising an internal wall facing the axis X, an external wall opposite to the internal wall and an upstream wall connecting the internal wall and the external wall and delimiting with the internal partition wall an annular cavity, sad downstream part comprising a downstream internal wall and a downstream external wall as an extension of the internal wall and the external wall of said lip respectively, and delimiting between them an internal volume, said air intake comprising:— a de-icing device comprising at least one duct for injecting a hot air flow into the annular cavity of the lip, — at least one passage opening formed in the internal partition wall, — at least one outlet opening formed in the downstream external wall of the downstream part of the air intake, and —at least one discharge conduit, mounted in the internal volume of the downstream part, configured to conduct the hot air flow from the passage opening of the internal partition wall to the outlet opening of the downstream external wall so as to discharge the hot air flow outwardly of the air intake, the discharge conduit comprising a first end connected to the internal partition wall, a second end connected to the downstream external wall of the downstream part and a main body extending between the first end and the second end, the main body comprising a downstream portion and an upstream portion, the downstream portion being elastomeric, the upstream portion of the main body being rigid.

2. The air intake according to claim 1, wherein the flexible portion of the main body comprises at least one elastomer.

3. The air intake according to claim 1, wherein the downstream portion and the upstream portion are sealingly connected.

4. The air intake according to claim 1, wherein the first end of the discharge conduit is in the form of a first plate.

5. The air intake according to claim 1, wherein the second end of the discharge conduit is in the form of a second plate.

6. An aircraft turbomachine extending longitudinally along an axis X in which an air flow circulates from upstream to downstream, said turbomachine comprising a nacelle comprising the air intake according to claim 1.

7. A method for discharging a hot air flow from an air intake, of a nacelle of an aircraft turbomachine extending longitudinally along an axis X in which an air flow circulates from upstream to downstream, said air intake comprising a lip extending upstream, a downstream part and an internal partition wall separating the lip and the downstream part, said lip comprising an internal wall facing the axis X, an external wall opposite to the internal wall and an upstream wall connecting the internal wall and the external wall and delimiting with the internal partition wall an annular cavity, said downstream part comprising a downstream internal wall and a downstream external wall as an extension of the internal wall and the external wall of said lip respectively, and delimiting between them an internal volume, said air intake comprising: — a de-icing device comprising at least one duct for injecting a hot air flow into the annular cavity of the lip, — at least one passage opening formed in the internal partition wall, — at least one outlet opening formed in the downstream external wall of the downstream part of the air intake, and — at least one discharge conduit, mounted in the internal volume of the downstream part, configured to conduct the hot air flow from the passage opening of the internal partition wall to the outlet opening of the downstream external wall so as to discharge the hot air flow outwardly of the air intake, the discharge conduit comprising a first end connected to the internal partition wall, a second end connected to the downstream external wall of the downstream part and a main body extending between the first end and the second end, the main body comprising a downstream portion and an upstream portion, the downstream portion being elastomeric, the upstream portion of the main body being rigid, the method comprising the steps consisting in: — injecting a hot air flow into the annular cavity of the lip, and — conveying the hot air flow from the passage opening of the internal wall to the outlet opening of the downstream external wall, so as to discharge the hot air flow outwardly of the air intake.

* * * * *